United States Patent [19]

Pedersen et al.

[11] Patent Number: 5,278,980
[45] Date of Patent: Jan. 11, 1994

[54] ITERATIVE TECHNIQUE FOR PHRASE QUERY FORMATION AND AN INFORMATION RETRIEVAL SYSTEM EMPLOYING SAME

[75] Inventors: Jan O. Pedersen, Palo Alto; Per-Kristian Halvorsen, Los Altos; Douglass R. Cutting, Menlo Park, all of Calif.; John W. Tukey, Princeton, N.J.; Eric A. Bier, Los Altos; Daniel G. Bobrow, Palo Alto, both of Calif.

[73] Assignee: Xerox Corporation, Stamford, Conn.

[21] Appl. No.: 745,794

[22] Filed: Aug. 16, 1991

[51] Int. Cl.⁵ .................... G06F 15/40; G06F 15/403
[52] U.S. Cl. ........................... 395/600; 364/DIG. 1; 364/282.1; 364/283.3; 364/286.3; 364/274.8; 364/253.1
[58] Field of Search ................ 364/900; 395/600, 275

[56] References Cited

U.S. PATENT DOCUMENTS

| | | | |
|---|---|---|---|
| 4,823,306 | 4/1989 | Barbic et al. | 364/900 |
| 4,972,348 | 11/1990 | Kleinberger | 364/900 |
| 4,972,349 | 11/1990 | Kleinberger | 395/144 |
| 5,117,349 | 5/1992 | Tirfling et al. | 395/600 |
| 5,206,949 | 4/1993 | Cochran et al. | 395/600 |

OTHER PUBLICATIONS

APS Text Search and Retrieval Classroom Manual, Planning Research Corp., Jun. 1989, Section 2, pp. 2-1 to 2-51.
Byte Magazine, Oct. 1988, pp. 234-268.
"Improving Retrieval Performance by Relevance Feedback"; G. Salton and C. Buckle; JASIS 41(4): 288-297 (Jun. 1990).
"Optimizations for Dynamic Inverted Index Maintenance"; D. R. Cutting and J. O. Pedersen; Proceedings of SFAIR '90 (Sep. 1990).
"An Object∝Oriented Architecture for Text Retrieval"; D. R. Cutting and P.-K. Halvorsen; Proceedings of RIAO '91; Barcelona, Spain (Apr. 1991).
Trends In . . . A Critical Review; Recent Trends in Hierarchic Document Clustering: A Critical Review; Information Processing and Management, vol. 24 No. 5, pp. 577-597, 1988.

Primary Examiner—Thomas C. Lee
Assistant Examiner—Wayne Ansbury
Attorney, Agent, or Firm—Oliff & Berridge

[57] ABSTRACT

An information retrieval system and method are provided in which an operator inputs one or more query words which are used to determine a search key for searching through a corpus of documents, and which returns any matches between the search key and the corpus of documents as a phrase containing the word data matching the query word(s), a non-stop (content) word next adjacent to the matching word data, and all intervening stop-words between the matching word data and the next adjacent non-stop word. The operator, after reviewing one or more of the returned phrases can then use one or more of the next adjacent non-stop-words as new query words to reformulate the search key and perform a subsequent search through the document corpus. This process can be conducted iteratively, until the appropriate documents of interest are located. The additional non-stop-words from each phrase are preferably aligned with each other (e.g., by columnation) to ease viewing of the "new" content words.

44 Claims, 7 Drawing Sheets

```
┌─────────────────────────────────────────────────────────┐
│ ▓GROILER'S ENCYCLOPAEDIA▓▓▓▓▓▓▓▓▓▓▓▓▓▓▓▓▓▓▓▓▓▓▓▓▓▓▓▓▓▓ │
│                                                         │
│  STEMS:      [MOVIE            ]    84/103 FOUND 207   │
│                                                         │
│  FREQUENCY: MOVIE = 135          SAME SENTENCE: [YES][NO]│
│                                                         │
│ ▓QUERY INTERACTION▓▓▓▓▓▓▓▓▓▓▓▓▓▓▓▓▓▓▓▓▓▓▓▓▓▓▓▓▓▓▓▓▓▓▓▓ │
└─────────────────────────────────────────────────────────┘
                         FIG.4
```

```
                              MOVIE ACTOR
  [BROOKS, MEL]               SILENT MOVIE
                       MOVIE (1976), HIGH
                              BROOKS'S MOVIE
                        MOVIE COMPANY
  [CAESAR, SID]               SILENT MOVIE
              MOVIE (1976) AND THE CHEAP
  [CARTER, NELL]              OPENED THE DOOR FOR MOVIE
                        MOVIE AND TELEVISION
  [CELLULOID]                 FIRES IN MOVIE
                        MOVIE THEATERS
  [CENSORSHIP]                BOOKSTORES AND MOVIE
                        MOVIE HOUSES
                              SIMULTANEOUSLY, THE MOVIE
                        MOVIE INDUSTRY
                              GOVERNMENTAL MOVIE
                        MOVIE CENSORSHIP
  [CHARADES]                  TITLE, MOVIE
                        MOVIE TITLE
  [CINEMATOGRAPHY]            CAMERA), A MOVIE
                        MOVIE CAMERA
```
                         FIG.5

```
┌─────────────────────────────────────────────────────────┐
│ ▓GROILER'S ENCYCLOPAEDIA▓▓▓▓▓▓▓▓▓▓▓▓▓▓▓▓▓▓▓▓▓▓▓▓▓▓▓▓▓▓ │
│                                                         │
│  STEMS:      [MOVIE INDUSTRY   ]    FOUND 12           │
│                                                         │
│  FREQUENCY: MOVIE = 135, INDUSTRY = 4012  SAME SENTENCE:[YES][NO]│
│                                                         │
│ ▓QUERY INTERACTION▓▓▓▓▓▓▓▓▓▓▓▓▓▓▓▓▓▓▓▓▓▓▓▓▓▓▓▓▓▓▓▓▓▓▓▓ │
└─────────────────────────────────────────────────────────┘
                         FIG.6
```

ITERATIVE TECHNIQUE FOR PHRASE QUERY FORMATION AND AN INFORMATION RETRIEVAL SYSTEM EMPLOYING SAME

BACKGROUND OF THE INVENTION

1. Field of the Invention

The present invention relates to information retrieval systems. More particularly, this invention relates to method and apparatus for assisting an operator in forming a phrase query for searching through a library of documents.

2. Description of Related Art

Due to the ever increasing affordability and accessibility of very large, online, text collections, Information Access, the science of processing natural language texts for the purposes of search and retrieval, has been the focus of heightened attention in the last few years, although researchers have been active in the field since the early sixties. Numerous approaches have been attempted, but they all suffer from the obvious difficulty that information access is quintessentially a cognitive task. The degree of automatic language understanding required for a complete solution is clearly outside the bounds of current technology. Instead, heuristic search techniques attempt to match an admittedly incomplete query description with an admittedly incomplete set of features extracted from the texts of interest. The interest therefore lies in the development of procedures that more effectively bridge the gap between an individual's partially stated desires and a universe of text, which appears, computationally, as a sequence of uninterpreted words.

Many of these procedures are statistical in nature. They take advantage of repeated occurrences of the same word to infer relations between documents, and between queries and documents. (A "document" need not correspond to any particular organization. It might be a chapter in a book, a section within a chapter, or an individual paragraph. However, as defined herein, a set of documents forming a corpus is an exhaustive and disjoint partition of that corpus. For example, similarity search induces a "relevance" ordering on the text collection by scoring each document with a normalized sum of importance weights assigned to each word in common between it and the query, where the importance weights depend upon document and collection, or corpus, frequencies. A more formal approach scores documents with their estimated probability of relevance to the query by adopting a text model which assumes word occurrences are sequentially uncorrelated and training on a set of known relevant documents. In contrast, polysemy (one word having multiple senses) and word correlation is directly addressed by Latent Semantic Indexing, which attempts to exact characteristic linear combinations through a singular value decomposition of a word co-occurrence matrix. The availability of interdocument similarity measures suggests clustering, which has been pursued both as an accelerator for conventional search and as a query broadening tool. Finally, linear discriminant analysis has been deployed to classify documents based on a training set which matches features, including word overlap and word positioning, with relevance to previous queries.

Another suite of techniques attempt to enrich the basic feature set by annotating words with their lexical and syntactic functions. For example, fast lookup algorithms from computational linguistics reduce words to their stems. See L. Karttunen et al, "A compiler for two-level phonological rules", Report CSLI-87-108, Center for the Study of Language and Information, 1987. Hidden Markov Modeling has been successfully employed to reintroduce part-of-speech tags given a lexicon with greater than 95% accuracy. See J. Kupiec, "Augmenting a hidden markov model for phrase-dependent word tagging", Proceedings of the 1989 DARPA Speech and Natural Language Workshop, Cape Cod, MA, October 1989. An extension of this technique, known as the inside-outside algorithm, promises a method for inducing a stochastic grammar given sufficient training text. See J. K. Baker, "Trainable grammars for speech recognition", Speech Communication Papers for the 97th Meeting of the Acoustical Society of America, pages 547–550, 1979; and T. Fujisaki et al, "A probabilistic method for sentence disambiguation", Proceedings of the International Workshop on Parsing Technologies, August 1989. Less ambitious procedures aim at robustly extracting noun phrases given a sequence of part-of-speech tags. Word co-occurrence relations have been exploited to order alternatives in cases of lexical ambiguity. Non-parametric classification procedures have been used to detect sentence boundaries in the face of typographic ambiguity. See M. Riley, "Some applications of tree-based modeling to speech and language", Proceedings of the DARPA Speech and Natural Language Workshop, Cape Cod, Mass., pages 339–352, Oct. 1989.

A typical information access scenario involves a corpus of natural language text documents, and a user with an information need (or interest). The task is to satisfy that need (or interest), usually by delivering one of more relevant documents from the corpus of interest. This is accomplished by extracting from each document a feature set, and providing the user with a tool which allows search over these features in some prescribed fashion. For example, a standard boolean search technique assumes the feature set is one or more words extracted from the text of the document, and the query language is boolean expressions involving those words. See IBM Germany, Stuttgart, "Storage and Information Retrieval Systems (STAIRS)", April 1972. Since it is anticipated that the corpus may be very large, construction of a feature index by preprocessing each document is a standard search accelerator. See G. Salton, "Automatic Text Processing", Addison-Wesley, 1989.

Conventional search techniques are cast within a framework that might be referred to as the library automation paradigm. It is presumed that the cost for evaluating a query is sufficiently high that a single iteration must return as high quality, and as complete, a response as possible. This is in keeping with online systems that charge for connect time, and is reflected in evaluation criteria that discount the cost of query formulation and measure the precision and recall levels for the ranked set of documents which is implicitly presumed to be the result. Ironically, the best improvements to date, with respect to these criteria, come from an incremental query reformulation technique, known as relevance feedback. See G. Salton et al, "Improving Retrieval Performance by Relevance Feedback", Journal of American Society for Information Science, 41(4): 288–297, June 1990.

Boolean keyword search is a well-known search technique in information retrieval. Essentially, a set of terms, typically individual words, or word stems, is extracted from the unrestricted text of each document in a larger corpus. Search then proceeds by forming a boolean expression in terms of these keywords which is resolved by finding the set of documents that satisfy that expression. For example, a typical query might consist of the conjunction of two search terms. Documents that contain both terms in any order and any position would then be returned. Disjunction and, less frequently, negation are also likely to be supported.

Unconstrained boolean search represents a document as a set of keywords; sequence information is ignored. Proximity search paradigms modify this representation by placing non-boolean nearness constraints on otherwise standard boolean queries. A proximity operator is introduced that demands that two given search terms occur within some given distance (expressed as a number of characters or a number of words) in order for the basic conjunction to satisfied. For example, the sample query above may be narrowed by requesting that the two search terms appear within one word of each other, in any order or, alternatively, in the given order.

Proximity search enables the user to form phrase-like queries; that is a combination of terms is treated as a search unit. This assumes considerable importance when one recalls that a query is a representation of an "information need". Often the concepts inherent in this information need are not expressible as single words. Instead, phrases and even complete sentences must be employed to fully disambiguate the thought. Conjunctive boolean queries allow for the expression of these sorts of combination, but they also clearly over-generate. Higher precision is achievable by making use of nearness constraints. At the other extreme, complete specification of term order may also be detrimental since it is a property of most natural languages (including English), that phrasal units may be rewritten in multiple ways without a change in meaning. For example "dog's ankle" and "ankle of a dog" express the same concept. Hence, the application of proximity constraints must be strong enough to filter out disconnected occurrences, yet flexible enough to account for trivial language variations.

Text retrieval may be thought of as iterative query refinement. Each stage involves a query specification followed by a resolution. If the results of the query satisfy the information need of the user, the process ends. Otherwise, a new, modified, and presumably more appropriate query must be formulated, and the process iterated. The results of the previous steps inform the query reformulation at each stage.

Traditional applications of boolean or proximity search provide little support for this reformulation process. These traditional applications usually only generate a candidate set of documents which satisfy the search criterion. The user must then judge the effectiveness of the query by perusing these documents, a potentially time consuming operation, especially if document titles are insufficient to disambiguate relevant from non-relevant hits. In fact, there is empirical evidence that boolean searches resolve into two classes, those whose result sets contain only a very few hits (narrow query), and those that result in a great many hits (broad query). In the case of only a few hits, the user is left with the uncomfortable feeling that something may have been missed, which leads to a desire to broaden the existing query. Arriving at an appropriate broadening can be elusive since no particular alternative is suggested by the search results themselves. If the query is over broadened, the user is presented with far too many hits, and the task of separating out the relevant documents from the mass becomes daunting.

The problem here is that the user is provided with little or no assistance in query reformulation. H. P. Frei et al, in "Caliban: Its user-interface and retrieval algorithm", Technical Report 62, Institut fur Informatik, ETH, Zurich, April 1985, the disclosure of which is incorporated herein by reference, discloses a dictionary of available search terms which can aid the search for alternative terminology, as well as an online domain-specific thesaurus. However, often, the help of a highly trained intermediary, such as a research librarian, is required to derive a desirable reformulation.

One solution is to provide enough information about each hit that the user can rapidly determine the contextual usage, and hence arrive at a relevance judgment and, possibly, a reformulation, without necessarily scanning the entire text. Paper-based keyword-in-context indices (sometimes known as permuted indices) offer a solution for the case of single term queries. The user enters the index with a single term, the word of interest, and finds, arranged alphabetically, single lines of context for each instance of that term, with the search term columnated at the center of each line. See H. P. Luhn, "Keyword-in-Context for Technical Literature", ASDD Report RC-127, IBM Corporation, Yorktown Heights, N.Y., August, 1959. The choice of an alphabetic sort key for the lines of context can be less than optimal if one is searching for related phrases containing the search key, since the words determining the phrase will typically be placed around the key, rather than heading the line. An alternative sort key that captures this intuition, has been employed successfully in the generation of an index to titles in Statistics and Probability. See I. C. Ross and J. W. Tukey, "Index to Statistics and Probability Permuted Titles", Volumes 3 and 4 of the Information Access Series, R & D Press, Los Altos, Calif., 1975; also available from the American Mathematical Society, Providence, R.I. Computerized versions of these sorts of indices exist in a variety of different forms, yet few, if any, elaborate on the basic query and display strategy.

Accordingly, a need exists for a search tool which will assist an operator in formulating a search query, particularly when the operator has little information about the corpus of documents which the operator is searching.

U.S. Pat. No. 4,823,306 to Barbic et al discloses a method for retrieving, from a library of documents, documents that match the content of a sequence of query words, and for assigning a relevance factor to each retrieved document. The method comprises the steps of: defining a set of equivalent words for each query word and assigning to each equivalent word a corresponding word equivalence value; locating target sequences of words in a library document that match the sequence of query words in accordance with a set of matching criteria evaluating a similarity value for each of the target sequences of words as a function of the corresponding equivalence values of words included therein; and obtaining a relevance factor for the library document based upon the similarity values of its target sequences.

U.S. Pat. No. 4,972,349 to Kleinberger discloses an interactive, iterative information retrieval and analysis system wherein a "table of contents" organized as a standard outline in some similarly graphic format, is dynamically generated in response to specific search requests. Documents satisfying the search request are categorized based upon the existence of predefined key words therein. The table of contents is organized into key word categories, sub-categories, sub-sub-categories, etc. The analysis process can be repeated for a specific category or sub-category of the table of contents to derive a new table of contents which is more focused and limited.

OBJECTS AND SUMMARY OF THE INVENTION

It is an object of the present invention to provide a search retrieval system and method which assists an operator in search key (query) formulation.

It is another object of the present invention to provide an information retrieval system and method which guides an operator through a set of likely relevant phrases as they occur in a target corpus to assist the operator in query formulation.

It is another object of the present invention to provide an information retrieval system and method which exposes an operator to variations in phrasal statements incorporating terms of interest, leading to a judgment of which of these phrases best capture the desired informational need or interest.

It is a further object of the present invention to provide an information retrieval system and method which identifies text fragments occurring in a corpus of documents which are more specific than an input search key (query) and which are presented in a manner which assists the operator in formulating further search keys.

To achieve the foregoing and other objects, and to overcome the shortcomings discussed above, an information retrieval system and method are provided in which an operator inputs one or more query words which are used to determine a search key for searching through a corpus of documents, and which returns any matches between the search key and the corpus of documents as a phrase containing the word data matching the search key, a non-stop word next adjacent to the matching word data, and all intervening stop-words between the matching word data and the next adjacent non-stop-word. The operator, after reviewing one or more of the returned phrases can then use one or more of the next adjacent non-stop-words as new query words to reformulate the search key and perform a subsequent search through the document corpus. This process can be conducted iteratively, until the appropriate documents of interest are located.

In one embodiment, only one non-stop-word (located immediately adjacent to the search key) is returned along with the query word(s) in each phrase. The additional non-stop-words from each phrase are preferably aligned with each other (e.g., by columnation) to ease viewing of the "new" content words. The aligned additional non-stop-words can be displayed in a distinctive form (e.g., highlighted) so that the new aspect of the returned word data is emphasized, rather than the old.

Separate phrases can be returned to display the non-stop-word on each side of each search key match. If an operator desires to view additional text (word data) associated with a returned phrase, an "extend" command is provided which causes the phrase to be extended from the displayed additional non-stop-word to the next adjacent non-stop-word. Alternatively, uninteresting phrases can be deleted from the display by providing a "forget" command. The length of each phrase can extend up to the entire length of a line on the display screen so that a maximum amount of context is provided, while still focusing operator attention on the next adjacent non-stop-word with the columnation and highlighting display features.

The search key is usually formed as a boolean conjunction between the query words with a proximity constraint of no more than one intervening non-stop-word (proximity constraint of one). Additional non-stop-words are then returned on one or both sides of any search key matches. If multiple query words are input, and the match includes the query words separated by a non-stop-word, that non-stop,-word is returned as the new (highlighted) non-stop word.

The present invention can also be used to search through a corpus of documents which are in a language different from the language in which the query words are input.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

A. Overview

The availability of high interaction user interfaces on modern workstations should adjust previous models of information retrieval systems. The present invention, by using a high interaction user interface brings the user back into the loop by making interaction between the user and partial search results an explicit component of query resolution. The user is employed as an active filtering and query reformulation agent, which is only plausible if one presumes rapid response to user intervention. The present invention is a form of guided boolean search with proximity, and an associated browsing tool, which exemplifies these principles, and which provides the operator with an amount of information in a format which is appropriate to assist in query formulation.

The present invention makes use of an interactive user interface. The basic underlying assumption is that short queries, consisting of a few search terms, are by their very nature radically incomplete, and imprecisely directed. Hence, query repair and elaboration through user interaction and iteration are essential to achieve adequate recall. This can be achieved through a high interaction interface which rapidly delivers results to the user in a way that can be quickly appreciated, and by offering a search method whose operation is intuitive and which offers information as to which next step will be most effective in achieving a desired result.

The present invention addresses these issues by allowing the user to directly inspect the space of phrases generated by a set of terms (query words) of interest. The intention is to aid query reformulation by exposing the user to the range of variation present in the target corpus. For example, a search performed by the present invention which is keyed by the single term "information" might display phrases such as "information storage and retrieval", "advances in information retrieval", "sensory information", and "genetic information" among others, each of which is guaranteed to occur in the target corpus. This additional information can be used by the operator to formulate the next query.

From the user's perspective, the present invention resembles a phrase search facility where the search keys are treated as constituents (query words), and completions are returned which contain these and new constituents, organized in a fashion that emphasizes the new rather than the old. Search key formulation consists of specifying one or more "constituents" (query words) in a way that requires little or no query syntax. These constituents are then matched against the corpus using a heuristic which interprets them as a boolean conjunction with a proximity constraint. Then, instead of returning matching documents and treating the search as if it were complete, as would a standard boolean search, the present invention returns phrases including matches embedded in a surrounding textual context. These phrases are intended to contain sufficient context to usually disambiguate usage, but not so much text as to distract the reader or clutter the display.

The current heuristic returns the text surrounding the search terms (the query words) plus one other "significant" word, where significance is operationally defined by not being on some prespecified list of non-topic bearing words (a stop list). The neighboring content word (the next non-stop-word adjacent to the query words) provides disambiguating context and can be highlighted in the display to draw the user's attention to what is new, rather than what was input (the query word(s)). Additionally, all stop-words located between the displayed non-stop-words (i.e., the query word(s) and the next significant word) are also displayed. If the context is insufficient to disambiguate usage, the user is encouraged to ask for more (an operation called "extend"). If the context shows a word combination which is a priori uninteresting, all phrases with similar word structure can be deleted (an operation called "forget"). The "forget" operation is, in effect, boolean negation by example.

Since the time constants associated with each of these operations can be made small, the overall effect is to encourage incremental query reformulation based on occurrences as they appear in the corpus of interest. In the case where the disambiguating context is sufficient to indicate that the returned phrase is indeed relevant, the user may proceed directly to the corresponding document.

B. Implementation

Figure 1:
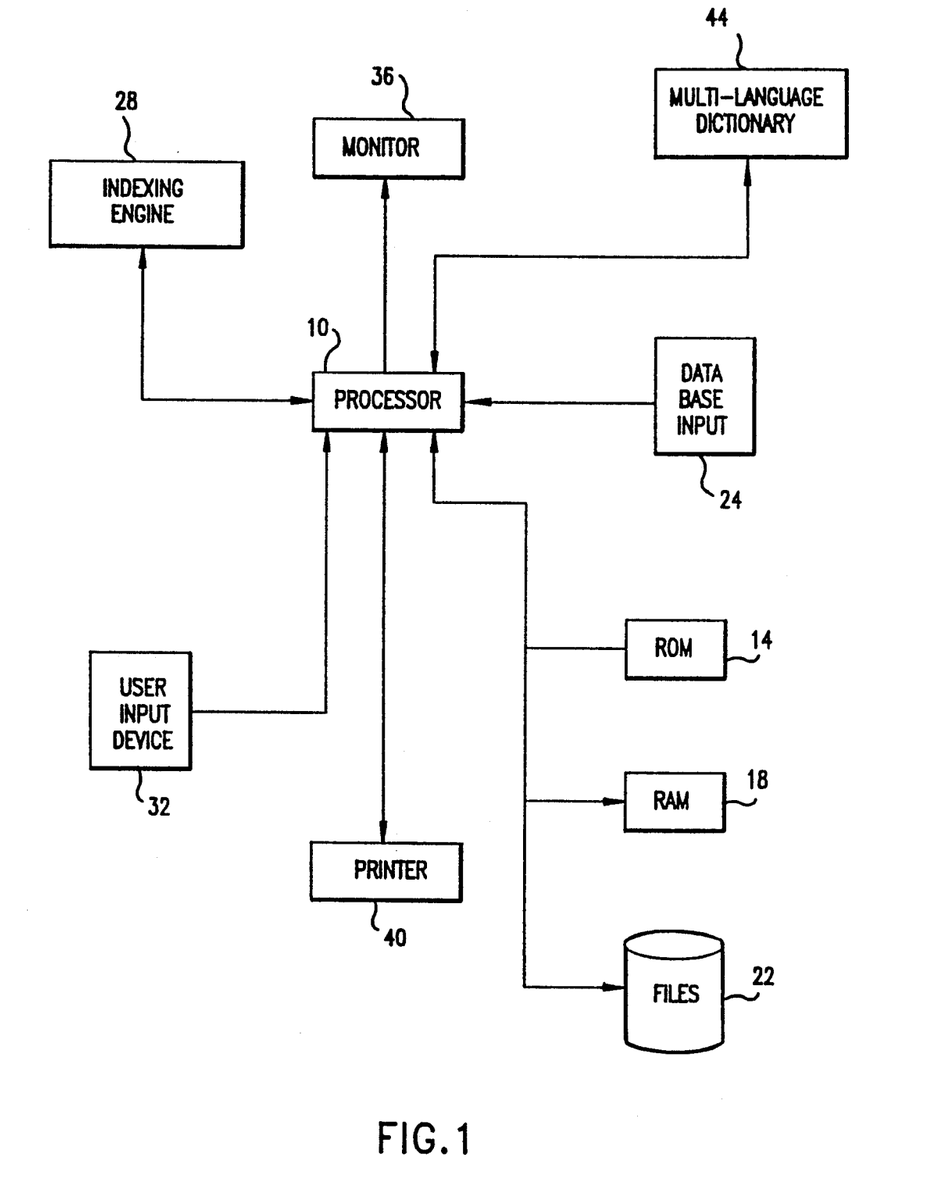
FIG. 1 is a block diagram of hardware components useable to practice the present invention.

The present invention can be implemented in an information retrieval system as illustrated by block diagram in FIG. 1. The information retrieval system includes a central processing unit (microprocessor) 10 for receiving signals from, and outputting signals to various other components of the system, according to one or more programs run on microprocessor 10. The system includes a read only memory (ROM) 14 for storing operating programs. A random access memory (RAM) 18 is provided for running the various operating programs, and additional files 22 could be provided for overflow and the storage of indexed text used by the present invention in performing a search operation.

Prior to performing a search, a target text corpus is input from a data base input 24, and is processed by an indexing engine 28 which extracts content words (ignoring words on a stop list) in each document of the target corpus. Optionally, the indexing engine can also normalize the content words, for example, through the performance of stemming operations. There are numerous prior art stemming algorithms. For example, stemming can be performed by using a dictionary-based exact inflectional morphology analyzer (an algorithm which only strips endings which do not change the part of speech, for example "s" and "ed"). Alternatively, tail cropping procedures which may produce non-words can be used. These algorithms often also consider derivational morphology (endings that change the part of speech, such as "ly" and "tion") as well as inflectional morphology. One might imagine additional normalizations, such as the replacement of words by thesaurus classes, the tagging of words with their part-of-speech, or the annotation of words with their syntactic and semantic roles.

Monitor 36 is provided for displaying search results, and for permitting the user to interface with the operating programs. A user input device 32 such as, for example, a mouse, a keyboard, a touch screen or combinations thereof is provided for input of commands by the operator. A printer 40 can also be provided so that hard copies of documents can be printed.

An on-line multi-language dictionary 44 can also be provided for searching through a corpus of documents in a language which is unfamiliar to the operator.

Figure 2:
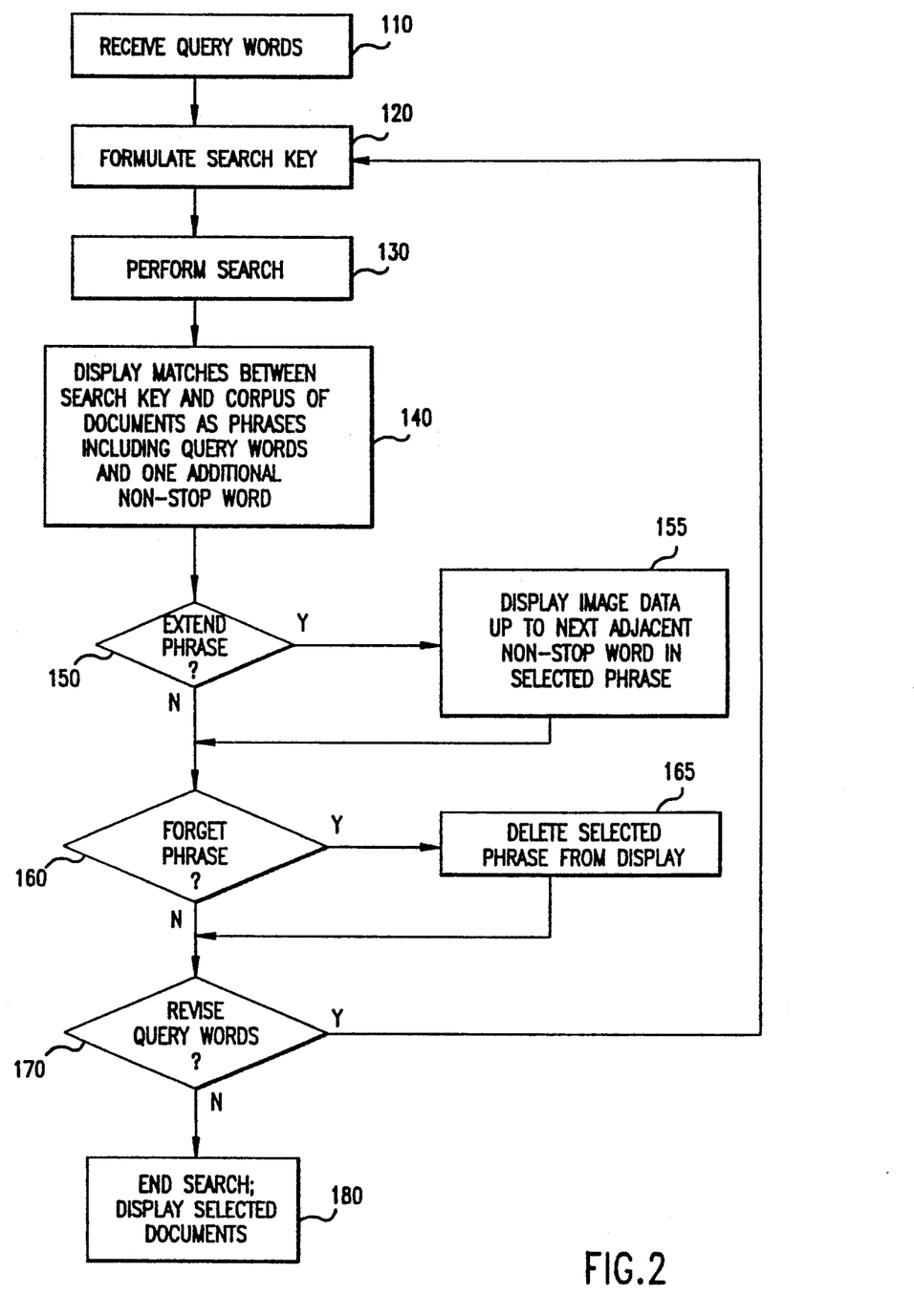
FIG. 2 is a high level flow diagram of the search process according to the present invention.

FIG. 2 is a high level flow diagram of the processes performed by the present invention. In step 110, the operator inputs one or more query words. These words can be input in a conventional manner, such as, for example, by typing the appropriate words in a display box using a keyboard. In step 120, the search key is formed. In the present invention, the search key is the boolean conjunction of all query terms with a proximity constraint of one. A query term is a disjunctive set of query words input by the operator. For example, if the operator input query words A and B, both A and B would be treated as query terms. Alternatively, if the operator input the words A and (B or C), A would be treated as a single query term and (B or C) would be treated as a single query term. The system can automatically treat each input query word as a query term so that the "and" connector need not be input by the operator. For example, "A B" would automatically be interpreted as "A and B".

In step 130, the search is performed. The search will return all phrases in the corpus of documents which include each query term and has a length equal to the number of query terms plus one additional non-stop-word (because of the proximity constraint of one). This one additional non-stop-word provides the operator with new information regarding the usage of the search terms in that match. In step 140, the returned phrases are displayed. The matches between the corpus of documents and search key are displayed as phrases which include the query word(s), one additional next adjacent non-stop-word, and all intervening text (stop-words, spaces, and punctuation). Accordingly, the operator is provided with one or more phrases which provide additional information regarding the matches (and thus the document associated with the matches). By selecting one of the displayed next adjacent non-stop-words as a new query word, and successively redetermining the search key and performing the search, phrases are returned having an increasing closeness to the operator's informational need.

In order to emphasize the new information provided to the user, it is desirable to display multiple matches on the display simultaneously, with each match consuming at most a single line on the display, and with the respective next adjacent non-stop-words from each phrase being aligned with each other in a common column (this is referred to as guttering). Preferably, the additional non-stop-words are displayed in a distinctive form, such as, for example, highlighting, different from the display of the other word data in the displayed phrases to further emphasize the new information over the old information. It is also possible to display the query words in italicized form so that they can be distinguished.

Although it is possible that the operator will be able to select the appropriate document or documents from the corpus after performing only a single search, it is more likely that additional operations will be necessary before the operator's informational need is satisfied. Accordingly, in step 150, an operator can extend a selected phrase in the display. As illustrated by step 155, when a phrase is extended, the next adjacent non-stop-word in the selected phrase is removed from the gutter (i.e., the common column) and the immediately next adjacent non-stop-word is placed in the common column and highlighted. The extend operation is performed, for example, when the originally highlighted non-stop-word provides little or no content information to the operator. Accordingly, additional text in the phrase is provided by moving on to the next non-stop-word. A phrase can be extended a plurality of times until the phrase consumes the entire length of a line of text on the display screen. It is generally desirable to maintain the query words on the display screen, and additionally it may be desirable to limit the extension operation to within a single sentence (since the context of a word can usually be determined from the sentence in which it is located). All phrases containing the same next non-stop-word are extended.

In step 160, a "forget" operation is performed. As illustrated in step 165, the forget operation results in the deletion of a selected phrase from the display. All phrases containing the same non-stop-word are also deleted from the list of returned phrases.

As described above, an operator can also revise the query words in step 170. This usually involves adding one or morel query words to the previously searched list of query words. Operation then returns to step 120 and the search and display operations are repeated until the operator ends the search in step 180 and, for example, views (and possibly prints) desired documents.

The information retrieval system according to the present invention can be extended by providing an on-line multi-language dictionary so that searches can be performed through a corpus of documents written in a language which is foreign to the operator. The problem with searching foreign language documents is twofold. First, formation of the query, and second, understanding of the results. The latter is particularly troublesome since translating a document is a costly and time consuming task, even with machine translation aids. The present invention assists in both these problems since the query length is usually small (as small as one word), and the number of additional context words returned for each match can be as low as a single word.

For example, assuming the user is a speaker of English, and wants to query a corpus of French documents, the user provides a pair of English words A and B, and specifies a corpus of documents in French. An English-to-French and French-to-English dictionary is also required. Searches proceed as follows: Use the dictionary to translate A to a set of corresponding French words A1, A2, A3 . . . , and to translate B to a set of corresponding French words B1, B2, B3 . . . . Find all phrases based on these pairs in any combination (i.e., search (A1 or A2 or A3 or . . . ) and (B1 or B2 or B3 or . . . ), with a proximity constraint of one). While many of these pairs do not really belong together, the corpus of documents itself will correct the error, because most of the pairs will simply not be found. For each phrase returned by this search, display both the French phrase, and the English language phrase formed by A, B and the set (C1, C2, C3 . . . ) of possible translations of the French context word, C, that was found near the translated pair A and B.

This technique does not require much translation. Since the phrases are short, local translation techniques (even using some idiom dictionaries) should work. The translation which is required can be done on the fly. In particular, documents need not be translated in entirety ahead of time. While precision may be somewhat low, recall should be high, and the interactive nature of the present invention should make it practical. Once a document is found that looks promising, then more sophisticated and time consuming tools can be used to attempt translation of larger document units than words. No particular language need be chosen a priori as the base language. Speakers of different languages can use the document corpus simultaneously, so long as dictionaries are available to and from their language.

In addition, the user need not know which language is used in the searched document corpus as long as the search system can identify which bilingual dictionaries to employ. In particular, the searched corpus may be multilingual, written in more than one language. For example, the corpus may be recent French, German, and Japanese patents, and an appropriate number of bilingual dictionaries can be provided for translating words.

EXAMPLE

A version of the above described search paradigm has been implemented which reifies the strategy outlined above. In particular, the present invention is one of the search modes supported by the Text Database architecture (TDB). See D. R. Cutting, J. Pederson, and P-K. Halvorsen, "An object-oriented architecture for text retrieval", in Conference Proceedings of RIAO '91, Intelligent Text and Image Handling, Barcelona, Spain, pages 285-298, April 1991, the disclosure of which is incorporated herein by reference. TDB is a software artifact implemented in Common Lisp (G. L. Steele, Jr. "Common Lisp, the Language", Digital Press, second edition, 1990) which is directed towards fast prototyping of retrieval systems. A user interface to TDB, known as the Text Browser, uses the Interlisp-D (Xerox Corporation, Interlisp-D Reference Manual, Xerox AIS, 1987) window system to present a multi-paradigm text search and retrieval tool 300 (see FIGS. 3A—3C). Currently, two search 15 modes are supported over the same corpus: similarity search and the phrase oriented technique of the present invention. The first two panels 310, 330 concern themselves with the phrase oriented technique query specification and the presentation of results, respectively, for the present invention. The third panel 350 is for the scrollable display of documents. The last two panels 360, 380 are concerned with similarity search and are not part of the present invention. The ordering is not particularly significant, although it is anticipated that the phrase oriented technique of the present invention will be most useful for fairly directed queries, the results of which can then seed a browsing method, such as similarity search.

Figure 3A:
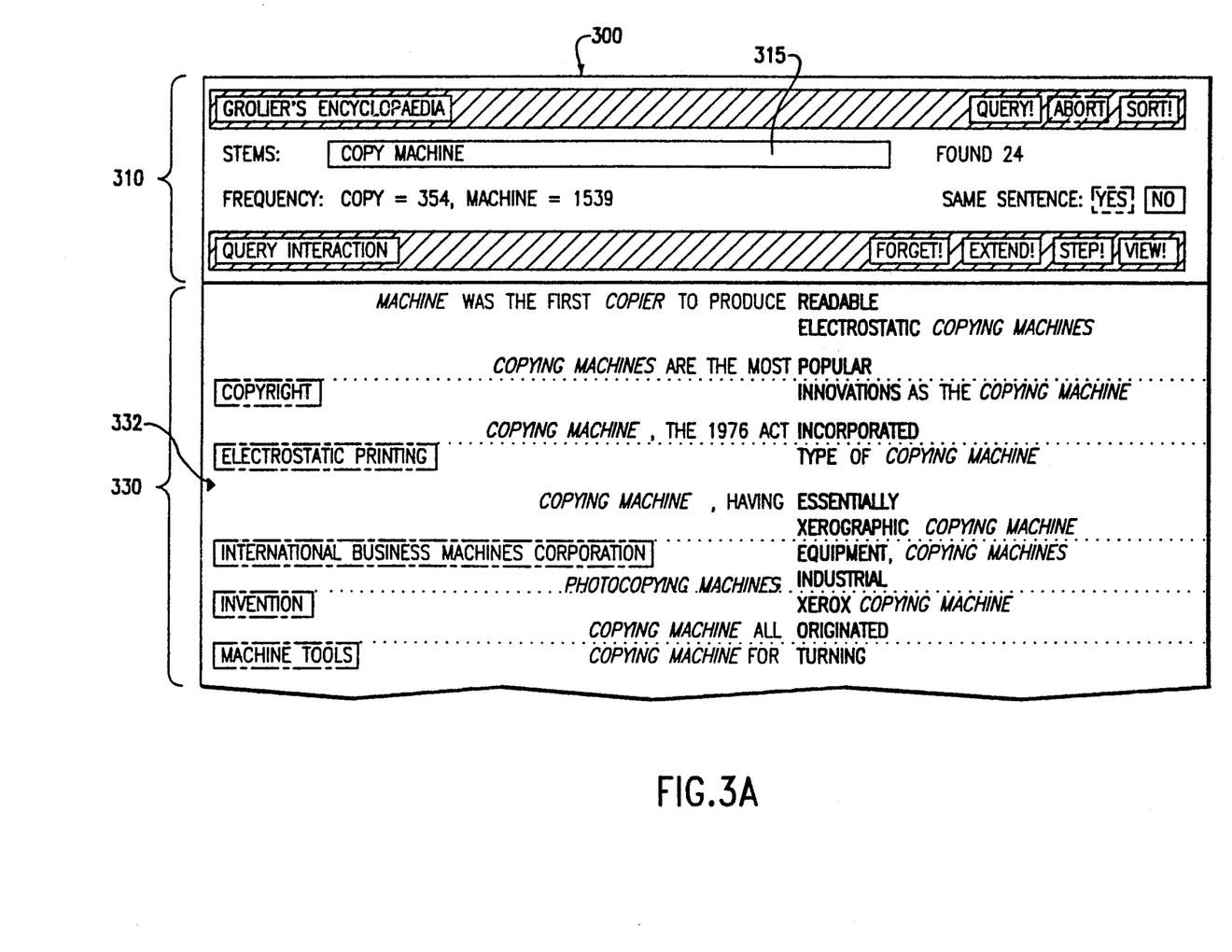
FIGS. 3A-3C illustrates a display screen on a retrieval system operating in accordance with the present invention.
Figure 3B:
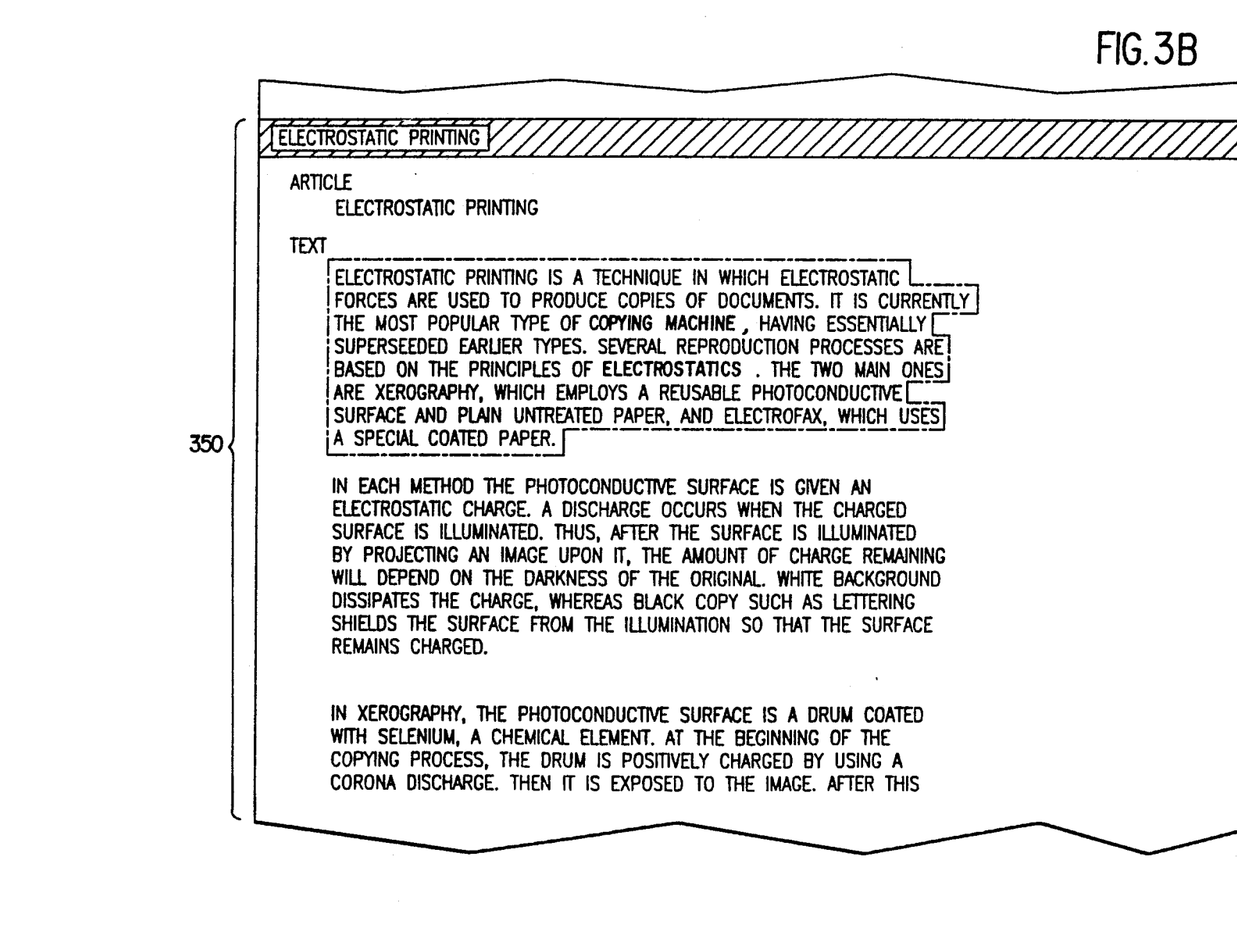
Figure 3C:
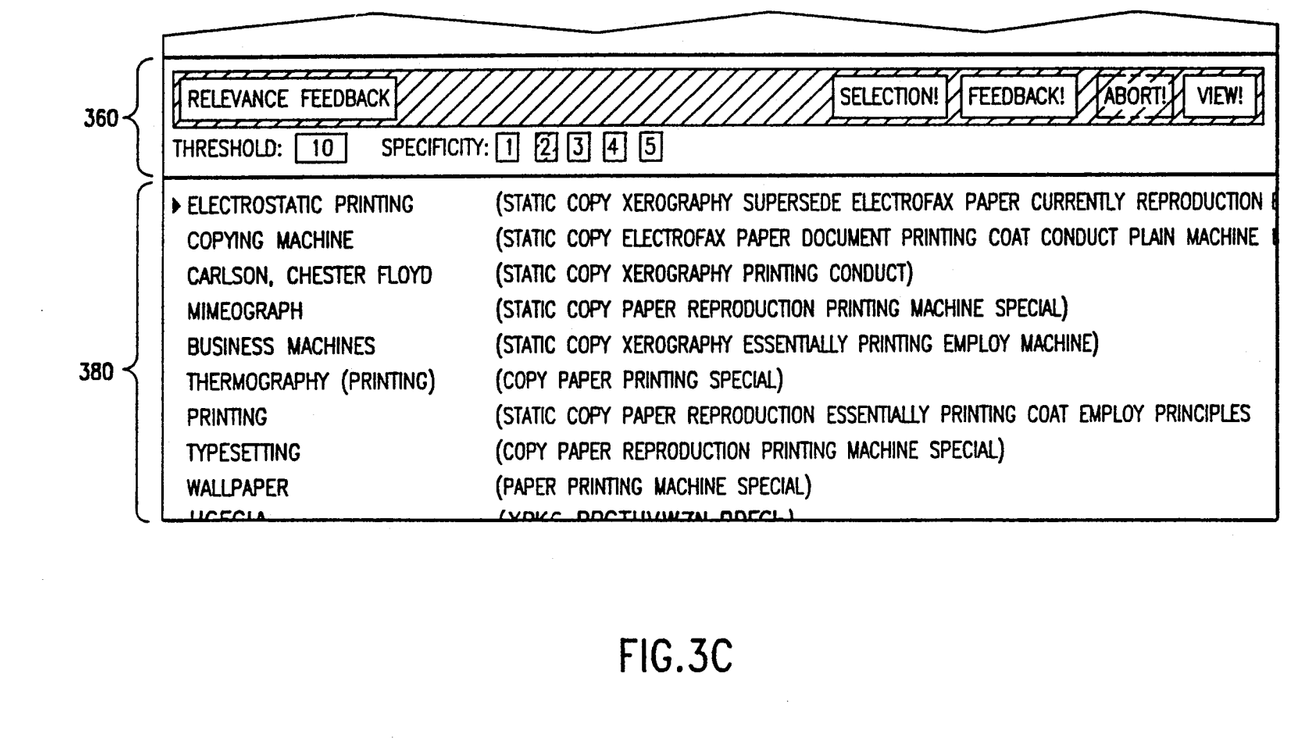

An upper portion of panel 310 includes three boxes, labeled "Query", "Abort", and "Sort" over which a cursor can be positioned and actuated to input commands (described below). A box, 315, is provided into which the operator can enter (by typing) query words. Additionally, a "Same Sentence" function can be activated or deactivated by buttoning a mouse cursor over the "Yes" or "No" boxes, respectively. When activated, the "Same Sentence" function limits returned phrases to occurrence within a single sentence. A "Query Interaction" bar is provided and includes the boxes "Forget", "Extend", "Step", and "View". The "Forget" and "Extend" boxes cause those operations to be performed on a selected phrase by buttoning a mouse when the cursor is located over the appropriate box. The "Step" box causes the incremental movement of the phrase selector 332 when activated. When phrase selector 332 is located at the bottom of display panel 330, activation of the "Step" box causes scrolling of the displayed phrases. The "View" box causes the document associated with the selected phrase to be viewed in the view screen 350.

Prior to search, the target text corpus (in this example, Grolier's encyclopedia, 64 Megabytes of ASCII text) was processed by an indexing engine that extracted the content words (ignoring words on a stop list) in each document (in this example, an article in the encyclopedia), normalized them through the removal of inflectional morphology, and recorded their sequential offsets in a b-tree based inverted index. See, for example, D. R. Cutting and J. O. Pederson, "Optimizations for dynamic inverted index maintenance", Proceedings of SIGIR '90, September 1990, the disclosure of which is incorporated herein by reference.

Figure 4:
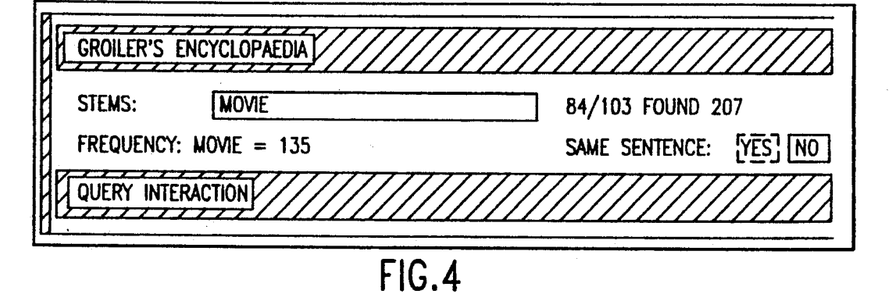
FIG. 4 is a view of a query formulation panel of the display screen of FIGS. 3A—3C.

Search then proceeds by specifying a set of words which will form the components of a phrase match criterion (see FIG. 4). The query words are typed into an area (i.e., box 315) on the display screen. When satisfied with the query, the operator buttons the "Query" box to start the search. The "Abort" box can be buttoned at any time to cancel a search. In this example the user is interested in phrases that include the word "movie" (or its inflectional variations). Note that the interface reports the marginal frequency of the search term, and the number of hits currently found. The query is resolved by interpreting it as a boolean conjunction with a proximity constraint (in this example a proximity constraint of one). A match occurs near one another if all query terms occur with no more than one non-stop word gap between them. In the example, since there is only one query term, all instances of "movie" match.

Figure 5:
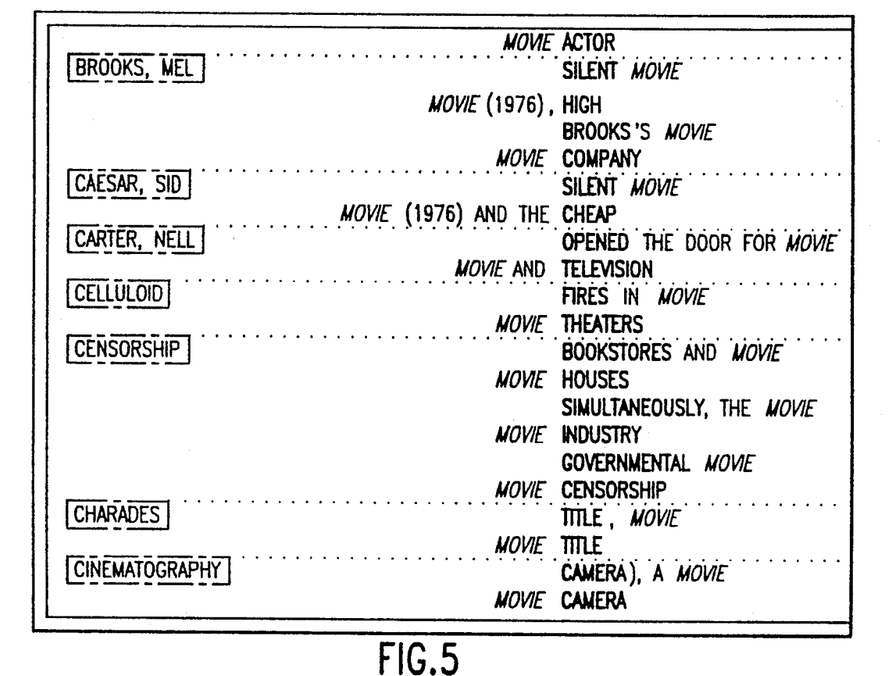
FIG. 5 is a view of the text phrase review panel of the display screen of FIGS. 3A-3C.

The result of a query is a set of text phrases, each satisfying the phrase match criterion (see FIG. 5). In the example each instance of "movie" generates up to two overlapping phrases-one for the additional context word on each side of the query word (for a total of 263). Since the sentence limitation is activated, some query word occurrences generate only one phrase. These are presented in a stylized fashion to aid perusal by the user. The display heuristic presents the query terms plus one additional non-stop-word and all the intervening (unindexed) text, containing space, punctuation and stopwords. It is hoped that the additional non-stop-word will provide disambiguating context. The inclusion of the intervening unindexed text, especially function words, provides useful syntactic information. Up to an entire line of text can be returned for each phrase, with only the next adjacent non-stop-word being highlighted. This provides an operator with a maximum amount of information, while still using the next adjacent non-stop-word for alignment.

To focus the user's attention on new information, the phrases are formatted so that the additional non-stop-word is placed adjacent to an easily recognizable location. This has the effect of columnating these contexts next to a vertical strip of white space, known as the "gutter". The gutter word is highlighted with a bold font, and the query terms are distinguished, but not emphasized, with an italic font. The final display is reminiscent of a keyword-in-context index, with the crucial difference that each gutter word is new information (not just part of the match criterion), and, may be the result of a multi-term query.

As with boolean search, no particular ordering of phrases is implied by the query resolution mechanism. In practice, it is convenient to organize phrases so that all phrases associated with a particular document appear in occurrence order. If documents are naturally stored in some order, perhaps alphabetically by title, which corresponds to a particular scan order through an inverted index, partial results may then be returned before the completion of the entire query. This is especially useful for queries with a large number of hits, since the user may begin perusal of the partial results without waiting for search termination. Other presentation orderings may also be useful. In particular, phrases may be sorted by the gutter word, or by schemes that extract a sort key from the sequence of content words. This could be accomplished either incrementally or after search termination. In the present example, buttoning the "Sort" box in panel 310 causes the phrases to be displayed in alphabetical 15 order by gutter word. When displayed in this manner, the document title in which each phrase is located is not displayed to the left of the phrases.

Figure 6:
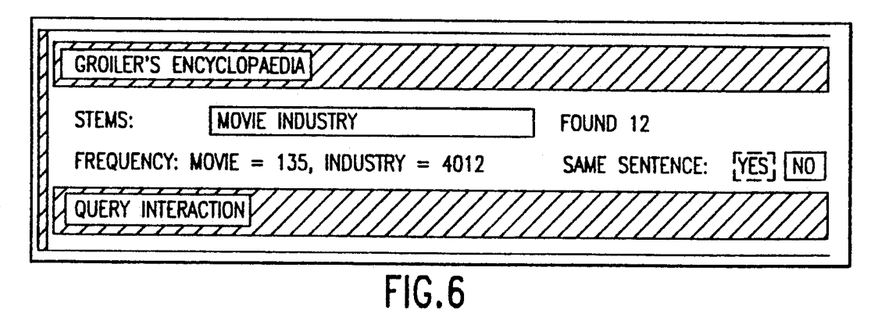
FIG. 6 is a view of the query formulation panel containing a reformulated query.
Figure 7:
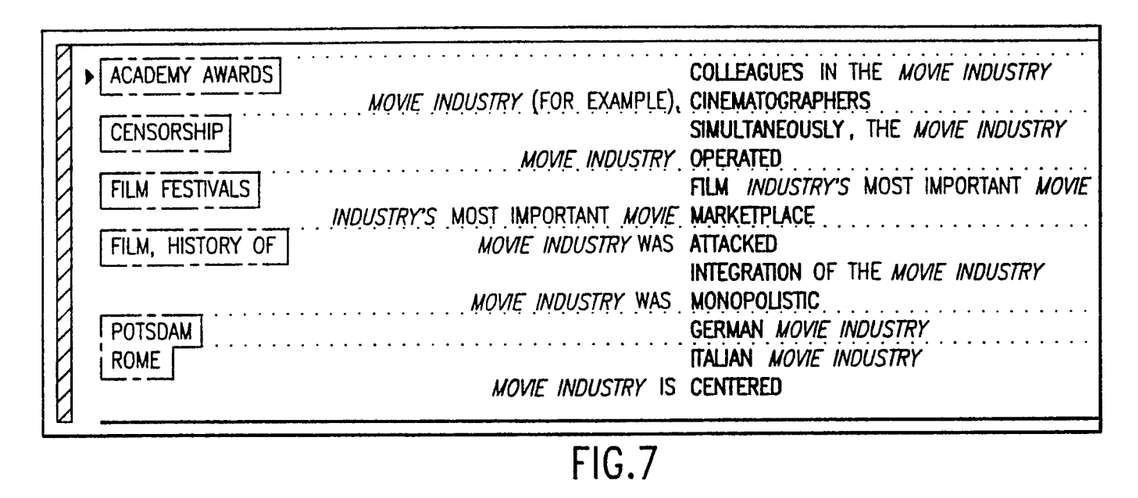
FIG. 7 is the text phrase review panel resulting from the FIG. 6 query reformulation.
Figure 8:
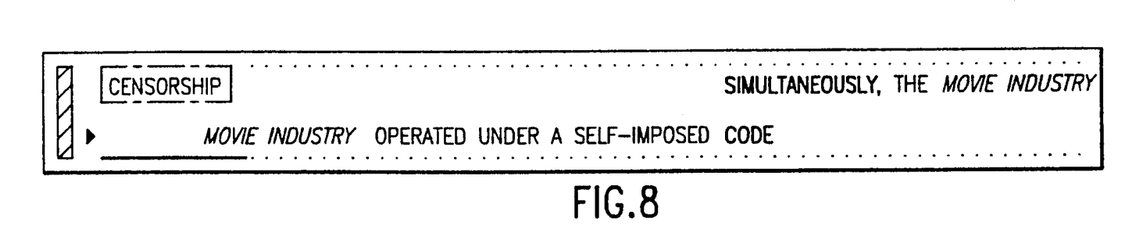
FIG. 8 is a portion of a phrase review panel illustrating the "extend" operation of the present invention.

In this example, the user can easily see by inspection that "movie" occurs in phrases such as "silent movie", "movie theater", "movie industry", as well as many others. To view more phrases without scrolling, the user at this stage may choose to eliminate phrases similar (in the sense of having the same gutter word) to the one currently selected by buttoning "forget" in the query panel. Alternatively, the user may narrow the query by picking one of the completions for further study. If the user re-evaluates the query adding "industry" as an additional term (see FIG. 6), twelve hits are returned (see FIG. 7). Again, by inspection it is easy to see, for example, that the article titled "Rome" has reference to the Italian movie industry. The phrase "movie industry operated" is not especially revealing; however, the user may button "extend" to enlarge the viewed context (see FIG. 8). As illustrated by FIG. 8, when "extend" is selected, the previous gutter word ("operated") is dehighlighted, and the next non-stop-word ("code") is aligned at the gutter. Any one of the phrases may be selected, and the associated document viewed (with the phrase highlighted) by buttoning "view" in the query panel.

Once a document is viewed, the similarity search operation can be performed. Similarity search is well known and not a part of the present invention. It can be implemented by prior art techniques. The similarity search user interface panel provides four selection boxes: "Selection", "Feedback", "Abort" and "View" to the operator. "Selection" causes a similarity search to be performed on the highlighted paragraph in the view panel 350. "Feedback" causes a similarity search to be performed on the entire document in the display screen. "Abort" and "View" function as described above.

ALGORITHMS

Algorithms are now provided which permit the present invention to be performed on a corpus of documents stored in an inverted index. This permits the extraction of possible searchable phrases from a target corpus represented as strings of words.

It is presumed that each document, d, in a larger corpus is a sequence of words, $$d = \{w_1^d, w_2^d, \ldots, w_{n_d}^d\},$$

where $n_d$ is the number of words instances in document d. It will be convenient in the following to consider each word occurrence as a word interval of length 1. That is, let $$(d,s,e) = \{w_s^d, w_{s+1}^d, \ldots, w_e^d\},$$

then $$d = \{(d,1,1),(d,2,2),\ldots,(d,n_d,n_d)\}.$$

In the case of intervals of length one, let $(d,s) = (d,s,s)$.

An inverted map can be produced by preprocessing each document. This map identifies each word with the length one intervals that contain it, $$I(w) = \{(d_1^w, s_{1,1}^w), (d_1^w, s_{1,2}^w), \ldots, (d_1^w, s_1^w, n_1^w),$$
$$(d_2^w, s_{2,1}^w), (d_2^w, s_{2,2}^w), \ldots, (d_2^w, s_2^w, n_2^w) \ldots,$$
$$(d_{n_w}^w, s_{n_w,1}^w), (d_{n_w}^w, s_{n_w,2}^w), \ldots, (d_{n_w}^w, s_{n_w}^w, n_{d_{n_w}}^w)\}$$

where $d_i^2$ is the $i^{the}$ document containing an instance of w, $s_i^w,j$ is the word offset of the $j^{the}$ instance of w in $d_i^2$, $n_d^w$ counts the number of instances of w in d, and $n_w$ is the number of documents in which w occurs. If there exists an ordering on documents, $<$, (we can always construct such an ordering), then we will require that $I(w)$ is ordered as follows:

$$d_i^2 < d_j^2 \text{ if } i<j$$

and $$s_{i,j}^2 < s_{i,k}^2 \text{ iff } j<k.$$

In this setting, it is natural to define disjunction as a merge operation on sequences of word intervals. That is, the result of a disjunctive query $q = \{w_1^q, w_2^q, \ldots, w_{n_q}^q\}$ is defined to be:

$$\bigcup_{i=1}^{q} I(w_i^q)$$

where $\cup$ denotes an n-ary merge operation on ordered sequences, as can be implemented by a priority queue in time proportional to $$(\log n_q) \sum_{i=1}^{q} |I(w_i^q)|.$$

See D. Knuth, "The Art of Computer Programming", Vol. 3: Sorting and Searching, Addison Wesley, 1973.

Similarly, conjunction with proximity can be seen as a specialized merge operation. Suppose q is satisfied by a sequence of words if every word $w_i^q$ occurs at least once in the sequence, and the total length of the sequence is no more than $|q|+p$, where $p \geq 0$ is the proximity parameter. Let $I_i = I(w_i^q)$, and define $f_j^i$ to be the $j^{the}$ interval in $I_i$. Set $c_i = 1$ for all i, and let $f_i = f_{c_i}^i$, initially the first interval in $I_i$. Let the $I_i$'s be ordered by considering the $f_i$'s:

$$I_i < I_j \text{ iff } f_i < f_j,$$

Let $(d_i, s_i)$ refer to $f_i$. Consider the following algorithm:

```
0 Result =  1  Sort the I_i's
            2  if d_i = d_j, 1 ≤ i, j ≤ n_q and
                  n_q-1
                   Σ  S_{i+1} - S_i ≤ p
                  i=1
               then append (d_1, s_1, S_{n_q}) to Result
            3  set c_1 = c_1 + 1
            4  if c_1 > |I(w_1^q)| return Result else goto 1
```

As defined here, not every interval that satisfies the query condition is necessarily returned; in cases where two candidate intervals share left edges, only the shorter will be selected. For example, suppose the query pattern is "xy" and p=1, then the sequence "xyy" will generate only one result interval, although two could be found. It is possible, with the addition of backtracking, to modify this algorithm to be fully correct.

In the worst case, the inner loop of this algorithm is executed $$\sum_{i=1}^{n_q} |I(w_i^q)|$$

times, while the cost of step [1] is proportional to $n_1 \log n_q$, hence the overall time complexity of this algorithm is proportional to $$(n_q \log n_q) \sum_{i=1}^{n_q} |I(w_i^q)|.$$

The above algorithms will return phrases of length q or q+1, when p=1. Phrases of length q can be extended to q+1 by adding a word to the left or the right. Thus, whenever a single query word is input, and sentence boundaries are not considered, each occurrence of the query word in the stored, indexed text can return two phrases. The first phrase will include the next adjacent non-stop-word on one side of the query word (e.g., the right side) and the second phrase will include the next adjacent non-stop-word located on the other side of the query word (e.g., the left side). If each phrase is displayed as an entire line of text, there will be considerable overlap between the two phrases returned for each match. Accordingly, it may be desirable to display only one phrase for each match, particularly, when an entire line of text is displayed.

When a plurality of query words are input, the returned phrase will include a number of non-stop-words equal to the number of query words plus one when p=1. If all of the query words are adjacent to one another, two phrases could be returned for each match as described above. However, if there is a one word space within the match, the non-stop-word (the gutter word) will be located in that space, and consequently, only a single phrase will be returned for that match.

The "extend" operation proceeds as follows. When an operator decides to extend a phrase, the gutter word of that phrase is added to the stop-list, and the returned list of phrases is modified (or reevaluated). This is much faster than re-performing the search over the entire 15 corpus of documents with an augmented stop-list. Accordingly, the reevaluated list of phrases can be quickly displayed to the user. Additionally, if the entire corpus of documents were re-searched with the gutter word added to the stop list, undesired phrases which were not returned previously could be returned.

When a new query term is added to the search, all previous extensions are forgotten. However, it is possible to add the previous non-stop words from extended phrases to the stop-list for all future searches over the entire corpus of documents.

The "forget" operation functions similar to the "extend" operation in that only the returned phrases are reevaluated. However, with the "forget" function, the gutter word of the forgotten phrase is treated as boolean negation over the displayed phrases. It should be noted, however, that re-searching the entire corpus of documents excluding the forgotten word would not return any new results (however, it would take longer than reevaluation).

As defined herein, a search is performed over the entire corpus of documents, and is a result of a query formulation operation. In order to quickly provide the operator with results of the "forget" and "extend" functions, "forget" and "extend" are not treated as searches. Instead, they are treated as reevaluations which take place over the set of returned phrases (not over the entire corpus).

C. Possible Extensions

The present invention can be extended in a variety of ways. First, the current heuristic for choosing the nearby disambiguating content word could be improved by statistically evaluating the likely topic determining value of a list of nearby candidate words. This could be accomplished either by considering importance weights (as defined by similarity search), or by computing a dispersion measure based on a clustering of the corpus.

If a stochastic part-of-speech tagger were available it could be employed in at least two ways. Since part-of-speech tagging can be sense disambiguating (for example, "package" as a noun has quite a different sense than "package" as a verb), the strategy would be to segregate (or sort) returned phrases based on the inferred part of speech of the query terms. Another use would feed a tagged extended context to a noun phrase recognizer in order to select a syntactically coherent subset for display purposes.

The present invention is useful in generating candidate phrases given a single term query. In this case, it may not be necessary to generate an exhaustive listing. Instead, similar phrases could be represented as a single paradigm. This reduction to equivalence classes would expose the variation present in the corpus more readily than the listing of repeated instance of the same (or similar) phrases.

Multi-term queries can be over-constraining. Some form of automatic broadening may be appropriate if only a few hits are found. This could be accomplished by selectively weakening the match criterion until, at the extreme, it becomes a disjunction, rather than a conjunction. Such a strategy would differentially weight returned phrases based on the degree of match - and sort them accordingly.

While the present invention is described with reference to a preferred embodiment, the particular embodiment is intended to be illustrative, not limiting. Various modifications may be made without departing from the spirit and scope of the invention as defined in the appended claims.

What is claimed is:

1. A method of selectively searching an automated data base with data processing apparatus, said data base containing a corpus of documents comprising sequences of word data stored as stop-words and non-stop-words in a memory, said method comprising the steps of:
   a) input at least one query word to said data processing apparatus;
   b) using said data processing apparatus, determining a word data search key based upon said at least one query word;
   c) using said data processing apparatus, searching said document corpus to identify all occurrences of a match between said search key and said document corpus word data;
   d) using said data processing apparatus, sequentially displaying said matches occurring in said document corpus, each match being displayed as a phrase containing the word data matching said search key, a non-stop-word next adjacent to said matching word data, and all intervening stop-words, between said matching word data and said next adjacent non-stop-word, said data processing apparatus displaying the phrases for multiple matches simultaneously and so that the respective non-stop-words are aligned with each other in a common column; and
   e) selecting one of said next adjacent non-stop-words as a new query word and successively repeating steps b)-d) using the selected new query word to locate documents of interest from said document corpus.

2. The method of claim 1, wherein said data processing apparatus determines said search key to be said at least one query word.

3. The method of claim 1, wherein a stemming operation is performed on said at least one query word by said data processing apparatus to determine said search key.

4. The method of claim 1, wherein the data processing apparatus displays said non-stop-words in a distinctive form different from the display of the other word data in the displayed phrases.

5. The method of claim 4, wherein the data processing apparatus displays said matching word data in italicized form.

6. The method of claim 1, further comprising:
using said data processing apparatus, extending, responsive to a command input from an operator, each displayed phrase to include the word data in the word data sequence containing the displayed phrase up to the non-stop-word next adjacent to the last displayed non-stop-word.

7. The method of claim 1, further comprising:
using said data processing apparatus, deleting a selected phrase from said displayed phrases responsive to a command input from an operator.

8. The method of claim 1, wherein said corpus of documents are stored in said memory in a first language and said at lest one query word is in a second language, different from said first language, and wherein said search key determining step includes the steps of:
 i) using a multi-language dictionary accessed by said data processing apparatus, translating said at least one query word from said second language to a corresponding at least one set of at least one corresponding query word in said first language; and
 ii) using said data processing apparatus, defining said search key so as to correspond to a boolean disjunction between the corresponding query words within each set of corresponding query words.

9. The method of claim 8, wherein said data processing apparatus displays each match by:
 i) displaying each phrase in said first language;
 ii) displaying a translation of said corresponding at least one query word from said displayed phrase in said second language; and
 iii) displaying a set of corresponding non-stop-words in said second language which result from translating the non-stop-word in each displayed phrase from said first language to said second language.

10. The method of claim 8, wherein said corpus of documents are stored in said memory in a plurality of different languages, at least some of said plurality of different languages being different from said second language, and wherein said translating step and said defining step include:
 i)a) using said multi-language dictionary and said data processing apparatus, translating said at least one query word from said second language; and
 ii)a) using said data processing apparatus, defining said search key so as to correspond to a boolean disjunction between the set of corresponding query words of each of said plurality of different languages.

11. The method of claim 1, wherein when a plurality of query words are input by an operator, said word data search key using said data processing apparatus, determining step includes:
determining said word data search key as a boolean conjunction between said plurality of input query words with a proximity constraint of one.

12. The method of claim 1, wherein said displaying step includes displaying one non-stop-word on only one side of each match.

13. The method of claim 1, wherein said displaying step includes displaying one non-stop-word on both sides of each match.

14. The method of claim 1, wherein when a plurality of query words are input by an operator, said displaying step includes:
displaying a non-stop-word on at least one side of said match if said match includes said query words located immediately adjacent to each other; and
displaying one non-stop-word between said query words if said match includes said query words within one word of each other.

15. The method of claim 1, wherein said selection of the next adjacent non-stop-word as a new query word and said successive repetition of steps b)-d) is performed by said data processing apparatus in response to a search command denoted by a cursor selection of a displayed next adjacent non-stop-word.

16. A method of selectively searching an automated data base with data processing apparatus, said data base containing a corpus of documents comprising sequences of word data stored as stop-words and non-stop-words in a memory, said method comprising the steps of:
 a) input at least one query word to said data processing apparatus;
 b) using said data processing apparatus, determining a word data search key based upon said at least one query word;
 c) using said data processing apparatus, searching said document corpus to identify all occurrences of a match between said search key and said document corpus word data; and
 d) using said data processing apparatus, displaying each match as a phrase containing the word data matching said search key, a single non-stop-word next adjacent to said matching word data in a distinctive form different from the display of other word data in the displayed phrases, and all intervening stop-words between said matching word data and said single next adjacent non-stop-word.

17. The method of claim 16, wherein the data processing apparatus determines said search key to be said at least one query word.

18. The method of claim 16, wherein a stemming operation is performed on said at least one query word by said data processing apparatus to determine said search key.

19. The method of claim 16, wherein the data processing apparatus displays the phrases for multiple matches simultaneously and so that the respective non-stop-words are aligned with each other in a common column.

20. The method of claim 16, wherein the data processing apparatus displays said matching word data in italicized form.

21. The method of claim 16, further comprising:
using said data processing apparatus, extending, responsive to a command input from an operator, each displayed phrase to include the word data in the word data sequence containing the displayed phrase up to the non-stop-word next adjacent to said single non-stop-word.

22. The method of claim 16, further comprising:
using said data processing apparatus, deleting a selected phrase from said displayed phrases responsive to a command input from an operator.

23. The method of claim 16, wherein said corpus of documents are stored in said memory in a first language and said at least one query word is in a second language, different from said first language, and wherein said search key determining step includes the steps of:

i) using a multi-language dictionary accessed by said data processing apparatus, translating said at least one query word from said second language to a corresponding at least one set of at least one corresponding query word in said first language; and ii) using said data processing apparatus, defining said search key so as to correspond to a boolean disjunction between the corresponding query words within each set of corresponding query words.

24. The method of claim 23, wherein the data processing apparatus displays each match by:

i) displaying each phrase in said first language;

ii) displaying a translation of said corresponding at least one query word from said displayed phrase in said second language; and iii) displaying a set of corresponding non-stop-words in said second language which result from translating the non-stop-word in each displayed phrase from said first language to said second language.

25. The method of claim 23, wherein said corpus of documents are stored in said memory in a plurality of different languages, at least some of said plurality of different languages being different from said second language, and wherein said translating step and said defining step include:

i)a) using said multi-language dictionary and the data processing apparatus, translating said at least one query word from said second language to a corresponding at least one set for each of said plurality of corpus document languages which are different from said second language; and ii)a) using the data processing apparatus, defining said search key so as to correspond to a boolean disjunction between the set of corresponding query words of each of said plurality of different languages.

26. A document retrieval system in which is stored a corpus of documents comprising sequences of word data stored as stop-words and non-stop-words in a memory, an apparatus for selectively searching through the corpus of documents comprising:

means for receiving at least one query word input by an operator of the document retrieval system;

means for searching through said document corpus and identifying all occurrences of a match between said document corpus word data and a search key determined based upon said at least one query word; and means for displaying each match as a phrase containing the word data matching said search key, a single non-stop-word next adjacent to said matching word data, and all intervening stop-words between said matching word data and said single non-stop-word, wherein said means for displaying simultaneously displays phrases for multiple matches so that the respective non-stop-words from each phrase are aligned with each other in a common column.

27. The apparatus of claim 26, further comprising:
means for selecting one of said displayed next adjacent single non-stop-words as a new query word to be used in determining said search key.

28. The apparatus of claim 26, wherein said means for searching determines said search key to be said at least one query word.

29. The apparatus of claim 26, wherein said means for displaying displays said non-stop-words in a distinctive form different from the display of other word data in the displayed phrases.

30. The apparatus of claim 29, wherein said means of displaying displays said matching word data in italicized form.

31. The apparatus of claim 26, wherein said means for displaying is responsive to a command input from an operator, so as to extend each displayed phrase to include word data in the word data sequence containing the displayed phrase up to a non-stop-word next adjacent to said single non-stop-word.

32. The apparatus of claim 26, wherein said means for displaying is responsive to a command input from an operator so as to delete a selected phrase from said displayed phrases.

33. The apparatus of claim 26, further comprising:
an on-line dictionary containing word data in first and second languages; and wherein:
said corpus of documents are in said first language;
said at least one query word is in said second language; and
said means for searching includes:
means for translating said at least one query word from said second language to a corresponding at least one set of at least one corresponding query words in said first language using said dictionary; and
means for defining said search key so as to correspond to a boolean disjunction between the corresponding query words within each set of corresponding query words.

34. The apparatus of claim 33, wherein said means for displaying:

i) displays each phrase in said first language;

ii) displays a translation of said corresponding at least one query word from said displayed phrase in said second language; and iii) displays a set of corresponding non-stop-words in said second language which result from translating the non-stop-word in each displayed phrase from said first language to said second language.

35. The apparatus of claim 33, wherein:
said on-line dictionary contains word data in a plurality of languages different from said second language;
said corpus of documents are in a plurality of languages, at least some of which are different from said second language;
said means for translating translates said at least one query word from said second language to a corresponding at least one set for each of said plurality of corpus document languages which are different from said second language; and
said means for defining defines said search key so as to correspond to a boolean disjunction between the set of corresponding query words of each of said plurality of different languages.

36. The apparatus of claim 26, wherein when said means for receiving receives a plurality of query words, said means for searching determines said search key as a boolean conjunction between said plurality of input query words with a proximity constraint of one.

37. The apparatus of claim 26, wherein said means for displaying displays one non-stop-word on only one side of each match.

38. The apparatus of claim 26, wherein said means for displaying displays one non-stop-word on both sides of each match.

39. A document retrieval system in which is stored a corpus of documents comprising sequences of word data stored as stop-words and non-stop-words in a memory, an apparatus for selectively searching through the corpus of documents comprising:

means for receiving at least one query word input by an operator of the document retrieval system;

means for searching through said document corpus and identifying all occurrences of a match between said document corpus word data and a search key determined based upon said at least one query word; and means for sequentially displaying each match as a phrase containing the word data matching said search key, at least one non-stop-word next adjacent to said matching word data in a distinctive form different from the display of other word data in the displayed phrases, and all intervening stop-words between said matching word data and said at least one non-stop-word, each phrase being displayed as no more than a single line of text.

40. The apparatus of claim 39, further comprising:
   means for selecting one of said displayed next adjacent single non-stop-words as a new query word to be used in determining said search key.

41. The apparatus of claim 39, wherein said means for displaying simultaneously displays phrases for multiple matches so that the respective non-stop-words from each phrase are aligned with each other in a common column.

42. The apparatus of claim 39, wherein said means for displaying displays said non-stop-words in a distinctive form different from the display of other word data in the displayed phrases.

43. The apparatus of claim 39, wherein said means for displaying displays one non-stop-word on only one side of each match.

44. The apparatus of claim 39, wherein said means for displaying displays one non-stop-word on both sides of each match.

* * * * *